(12) United States Patent
Fu

(10) Patent No.: US 7,705,748 B2
(45) Date of Patent: Apr. 27, 2010

(54) APPARATUS AND METHOD FOR WARNING AND PREVENTION OF VEHICLE COLLISIONS

(76) Inventor: Jianzhong Fu, Unit 2-1-2, No. 5 Building, No. 8 Xiqing Road, Diecai District, Guilin (CN) 541001

( * ) Notice: Subject to any disclaimer, the term of this patent is extended or adjusted under 35 U.S.C. 154(b) by 271 days.

(21) Appl. No.: 11/813,235

(22) PCT Filed: Dec. 31, 2005

(86) PCT No.: PCT/CN2005/002420

§ 371 (c)(1),
(2), (4) Date: Jul. 2, 2007

(87) PCT Pub. No.: WO2006/069550

PCT Pub. Date: Jul. 6, 2006

(65) Prior Publication Data

US 2008/0165029 A1    Jul. 10, 2008

(30) Foreign Application Priority Data

Jan. 2, 2005    (CN) .................. 2005 1 0005412

(51) Int. Cl.
*G08G 1/16* (2006.01)

(52) U.S. Cl. .............. 340/903; 340/905; 340/425.5; 340/426.23; 340/436; 340/438; 340/463; 340/464; 340/465; 340/466; 340/467; 340/471; 340/539.1

(58) Field of Classification Search .......... 340/903, 340/905, 901, 425.5, 426.22, 426.23, 436, 340/438, 439, 463, 464, 465, 466, 467, 471, 340/539.1, 576

See application file for complete search history.

(56) References Cited

U.S. PATENT DOCUMENTS

| 5,014,804 | A | * | 5/1991 | Suzuki | ................ 180/178 |
| 5,270,708 | A | * | 12/1993 | Kamishima | ........... 340/995.24 |
| 5,447,363 | A | * | 9/1995 | Fukamachi | ................ 303/125 |
| 6,043,773 | A | * | 3/2000 | Watanabe | ................ 342/71 |
| 6,157,246 | A | * | 12/2000 | Saitou et al. | ............... 327/540 |
| 6,625,540 | B2 | * | 9/2003 | Kageyama | ................ 701/301 |
| 6,681,157 | B2 | * | 1/2004 | Kageyama | ................ 701/1 |

* cited by examiner

*Primary Examiner*—Matthias Scholl
(74) *Attorney, Agent, or Firm*—Matthias Scholl P.C.; Matthias Scholl

(57) ABSTRACT

The invention teaches a passive vehicle rear end warning and collision prevention method and apparatus thereof, comprising: a traveling data monitoring unit serving to monitor and sample the traveling data of present vehicle; a collision prevention information transmitting and receiving unit serving to transmit and receive the collision prevention information; an electronic control unit serving to analyze and process the sampled data so as to generate the collision prevention information and to receive the collision prevention information from other vehicle, and to control the traveling status of prevent vehicle based on the received collision prevention information so as to avoid rear end collision with other vehicle, so that the purpose of rear end warning and collision prevention is realized by receiving passively the collision prevention information from another vehicle.

9 Claims, 4 Drawing Sheets

APPARATUS AND METHOD FOR WARNING AND PREVENTION OF VEHICLE COLLISIONS

FIELD OF THE INVENTION

This invention relates to the field of vehicle collision prevention technology, and more particularly, to passive vehicle rear end warning and collision prevention technology, and specifically, to an apparatus and method for warning and prevention of vehicle rear end collisions.

BACKGROUND OF THE INVENTION

Vehicle rear end warning and collision prevention is an important technological area in vehicle safety. The main reasons for vehicle rear end collision are: 1) insufficient travel distances between two vehicles; 2) adverse traveling environment, such as poor visibility due to rain, fog or snow; 3) emergency conditions such as punctured tire or broken axle; and 4) insufficient visibility of vehicles stalled on the way or pulled off to the road side.

In view of reasons 1), 2), and 3), an important factor contributing to collisions is the lag time in applying brakes or other contingency measures resulting from the brake reaction time of the driver. Owing to physiological limitations of human beings, the brake reaction time is about 1 s when the traveling speed is 60 km/h, and exceeds 2 s when the traveling speed is 120 km/h. The accidents due to the brake delay caused by the brake reaction time are dreadful; the driver cannot brake the vehicle effectively when the distance is in the range of 20-60 m resulting in rear end collision accidents.

The main research direction of existing technology is an active vehicle distance detection rear end collision warning and prevention system supported by the basic principle of vehicle distance detection technology, such that a present vehicle detects the objects (either moving or standing) within a certain distance in front of the present vehicle by the technologies such as ultrasonic, infrared, laser light, microwave Doppler, or video imaging and calculates its relative distance and speed so as to interpret the risk level of rear end collision, and thus, to start the warning system or automatic speed deceleration system so as to prevent or avoid the rear end collision. However, the existing technology has such problems as the blind area or the dead angle existing in distance scanning and detection, complicated system, poor reliability and high cost.

DESCRIPTION OF THE INVENTION

In view of the above-described problems, it is one objective of the invention to provide a passive vehicle rear end warning and collision prevention method and apparatus so as to overcome the technological deficiency of the existing technology, and to realize the purpose of collision prevention by receiving passively collision warning information from other vehicles.

In accordance with the objective of the invention, there is provided a passive vehicle rear end warning and collision prevention method and apparatus, comprising the processes of: monitoring and sampling the traveling data of present vehicle; generating collision prevention information according to the monitored and sampled traveling data; transmitting orderly the collision prevention information according to predetermined program to avoid rear end collision by other vehicles; alternatively, receiving the collision prevention information from other vehicles; comparing the collision prevention information with the traveling data of present vehicle to adjust and control the traveling status of present vehicle, and thus to avoid rear end collision with other vehicle transmitting the collision prevention information.

In certain embodiments of the invention, the traveling data comprises present vehicle speed data, traveling direction data, collision or brake deceleration data, brake pressure data, data of present vehicle emergently pulled off to the road side, data of present vehicle stalled on the way, data of present vehicle traveling in poor visible environment, data of present vehicle passing request, and so on.

In certain embodiments of the invention, the radio transmitting and receiving frequency is in the microwave range (above 300 MHz), the signal is transmitted and received in accordance with a predetermined program of same frequency time-sharing transmitting and receiving but the receiving is prior. An all-directional transmitting antenna and a fixed direction receiving antenna are adopted so that only the radio signal transmitted from a certain area in front of the present vehicle can be received.

In certain embodiments of the invention, the function of rear end warning and collision prevention is realized by adjusting and controlling the traveling status of present vehicle based on the processing and comparison of the received collision prevention information with the relevant traveling data of present vehicle, with the specific steps of: analyzing and processing the sampled data (sensor sampled data or manual set data) of present vehicle by an electronic control unit (ECU) to generate collision prevention information; transmitting the collision prevention information to a radio transmitting circuit; controlling the radio transmitting circuit to transmit the collision prevention information according to the predetermined program of same frequency time-sharing transmitting and receiving but the receiving is prior; alternatively, comparing the received collision prevention information with the relevant traveling data of present vehicle by the ECU to determine the traveling direction; determining the distance range according to the collision prevention joint control signal strength level; comparing the speed data of collision prevention information with the real speed of the present vehicle to determine whether to request passing or not; outputting traveling status control command or drive power according to the predetermined program to adjust and control the traveling status of the present vehicle.

In accordance with the objective of the invention, there is provided a passive vehicle rear end warning and collision prevention apparatus, comprising a traveling data monitoring and sampling unit, a microwave (including RF) radio transmitting and receiving unit, and an electronic control unit (ECU).

In certain embodiments of the invention, the traveling data monitoring and sampling unit serves to monitor and sample the traveling data of present vehicle, and comprises a sensor monitoring and sampling part and a manual set sampling part, wherein the sensor sampling data includes speed, brake or collision deceleration, brake pressure, traveling direction, etc. These data are variable data, and are sampled automatically by the sensor. The manual set sampling data are the preset signals such as poor visibility, pulled off to the road side, stalled on the way, etc. These data are constant data, and are sampled manually by turning on the corresponding switches by the driver according to the traveling environment. The sampled data is transmitted to the electronic control unit.

In certain embodiments of the invention, the microwave radio transmitting and receiving unit serves to transmit the collision prevention information of present vehicle, and/or receive the collision prevention information from other vehicles. The transmitting of collision prevention information is controlled by the ECU unit according to the predetermined program of same frequency time-sharing transmitting and receiving but the receiving is prior. The microwave radio transmitting part adopts an all-directional antenna so as to eliminate the dead area of signal transmission; the receiving part adopts a fixed directional antenna so as to only receive the radio signal from a certain area in front of the present vehicle.

In certain embodiments of the invention, the electronic control unit (ECU) serves to process and analyze the traveling data of present vehicle to generate collision warning and prevention information according to predetermined program. When the manual set data is transmitted to the ECU, the collision prevention information can be generated immediately. For example, when the driver turns on the switch of poor visibility, the collision prevention information corresponding to the poor visibility is generated immediately. When the sensor sampled data reaches a certain magnitude, the collision prevention information can also be generated. For example, if the preceding vehicle is emergently braked or has collided, resulting in the brake or collision deceleration reaching the predetermined magnitude, the collision prevention information of preceding vehicle that emergently braked or collided is then generated.

In certain embodiments of the invention, the collision prevention information comprises a rear end warning signal, a collision prevention joint control signal, a real speed signal and a traveling direction signal. The present vehicle traveling speed and direction signal will not be transmitted independently as collision prevention information, and is combined and transmitted together with other relevant collision prevention information. For example, when the driver turns on the poor visibility switch, the collision prevention information corresponding to the poor visibility will automatically include the traveling direction and the speed signal of the present vehicle.

In certain embodiments of the invention, another function of the electronic control unit (ECU) is to compare the received collision prevention information with the relevant traveling data of the present vehicle so as to determine the traveling direction; to determine the distance range according to the intensity of the collision prevention joint control signal; to compare the speed data of collision prevention information with the real speed of the present vehicle so as to determine whether or not to request passing over; and to output the traveling status control command or drive power according to the predetermined program so as to adjust and control the traveling status of the present vehicle to avoid rear end collision.

As a result, the passive vehicle rear end warning and collision prevention method and apparatus of the invention provide the following advantages:

1) the invention adopts an all-directional antenna to transmit collision prevention information, so that the dead area or blind area of signal transmission is eliminated in the effective coverage range of radio waves;

2) the invention adopts the work mode of same frequency time-shared transmitting and receiving the receiving occurs prior to transmitting, so that the intervening problem of same frequency transmitting and receiving is solved; the transmitting and receiving of radio wave transceivers in potential multiple vehicles (self organized network) in the effective coverage range of radio wave communication can be organized orderly even without code identification (open transmitting and receiving);

3) the invention adopts traveling direction interpretation and fixed direction receiving technology; the traveling direction interpretation can eliminate the utilization of collision prevention information from other vehicles traveling in opposite direction; the fixed direction receiving can filter the collision prevention information from the vehicles traveling behind or side by side with the present vehicle, so that the equivalent function of double directional transmitting and receiving of the existing technology can be realized and the cost can be largely decreased; the traveling direction interpretation and fixed direction receiving can ensure that only vehicles traveling in the same direction behind the present vehicle can receive the warning and collision prevention information;

4) the invention adopts radio field signal power level comparison technology, the relative distance between two vehicles is estimated in a simple way through the monitoring and sampling of power level magnitude corresponding to the radio signal intensity at the real time position of the present vehicle; compared with the active distance scanning and detecting technology of the existing technology, the invention is simplified and is suitable for the applications where the precision of distance detection is not important, leading to cost savings; and 5) the invention can ensure traveling safety under the condition of poor visibility; when traveling in a poor visible environment, the driver has to turn on the manual warning switch for poor visibility, then the present vehicle can transmit collision prevention information to the following vehicle, and can receive the collision prevention information from the preceding vehicle, so that a safe distance between the two vehicles can be kept to avoid rear end collision, and thus, the potential accident when the highway is closed or the highway is not closed timely can be reduced; the effect is significant and beneficial.

Another important reason causing rear end collisions is that the safety traveling distance between two vehicles is not well kept. When the distance between two vehicles is within the range of 50 m, once the preceding vehicle is emergently braked or collided, the present vehicle is not able to be braked within 1-2 s due to the physiological limitation of the driver, resulting in 30-50 m deadhead traveling distance such that the driver can do nothing to avoid the occurrence of rear end collision. With the technology of the invention, within the distance of 50 m, the emergent brake of the preceding vehicle can jointly control the brake of the following vehicle, so that the physiological limitation of the driver is remedied, and thus the occurrence of the rear end collision is avoided.

DESCRIPTION OF THE INVENTION

The passive vehicle rear end warning and collision prevention method of the invention will hereinafter be described further in accordance with the accompanying drawings.

Figure 1:
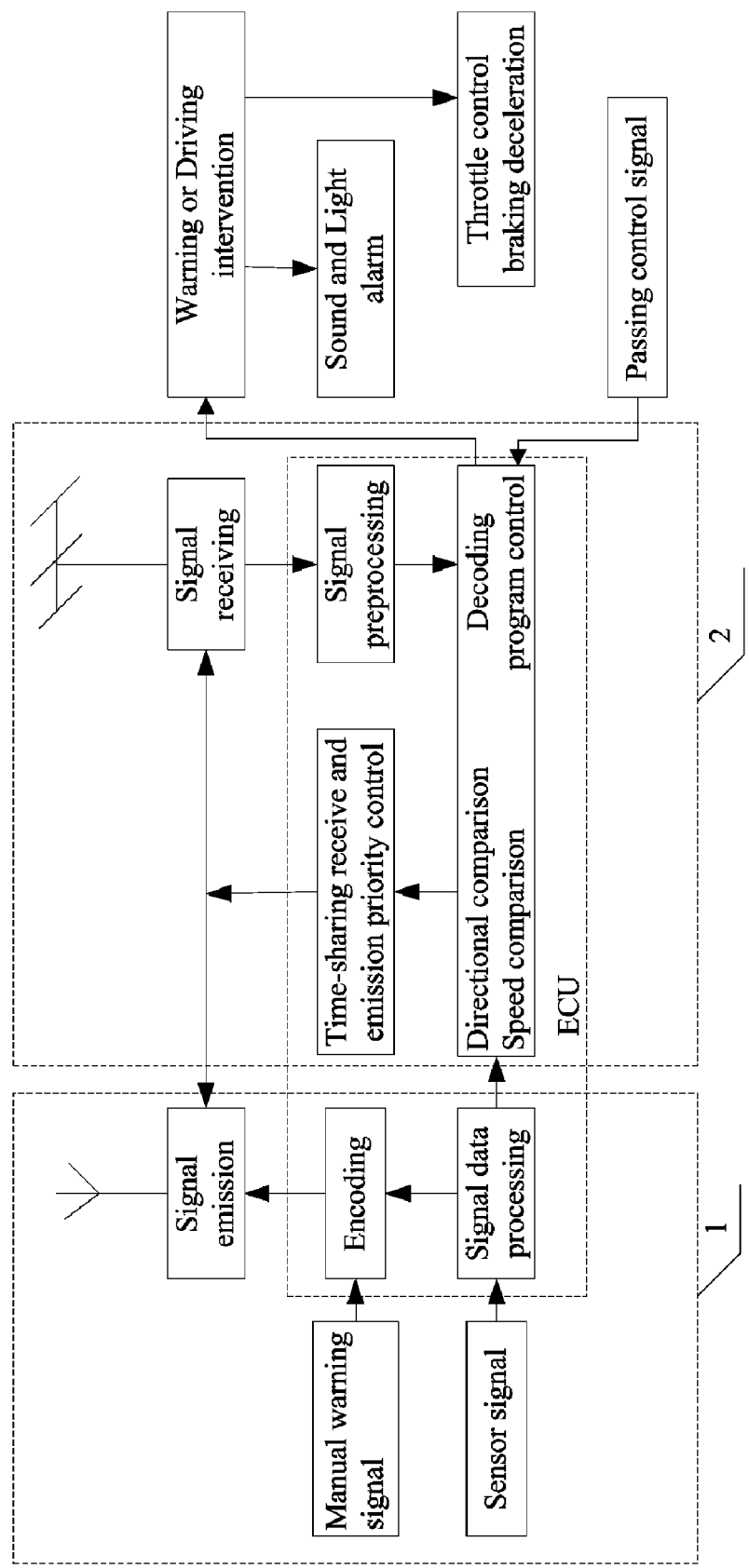
FIG. 1 is a principle diagram in accordance with one embodiment the invention.

The invention comprises a traveling data monitoring, encoding, and transmitting unit 1 acting as the traveling data monitoring unit, collision prevention information transmitting unit and an information receiving; electronic control unit (ECU) 2 (comprising a CPU, a RF transceiver circuit, and an auxiliary circuit) acting as the collision prevention information receiving unit and traveling status control unit, as shown in FIG. 1.

The monitored and sampled by the sensor traveling data is transmitted to the ECU directly for analyzing and processing so as to generate collision prevention information. Some of the data, such as speed, and traveling direction, are combined in the program controlled comparison signal.

The ECU circuit performs logical calculation and judgment to the received collision prevention information transmitted from other vehicles according to the predetermined program so as to implement rear end collision warning and collision prevention intervene measures, including braking and decreasing the throttle.

Figure 2:
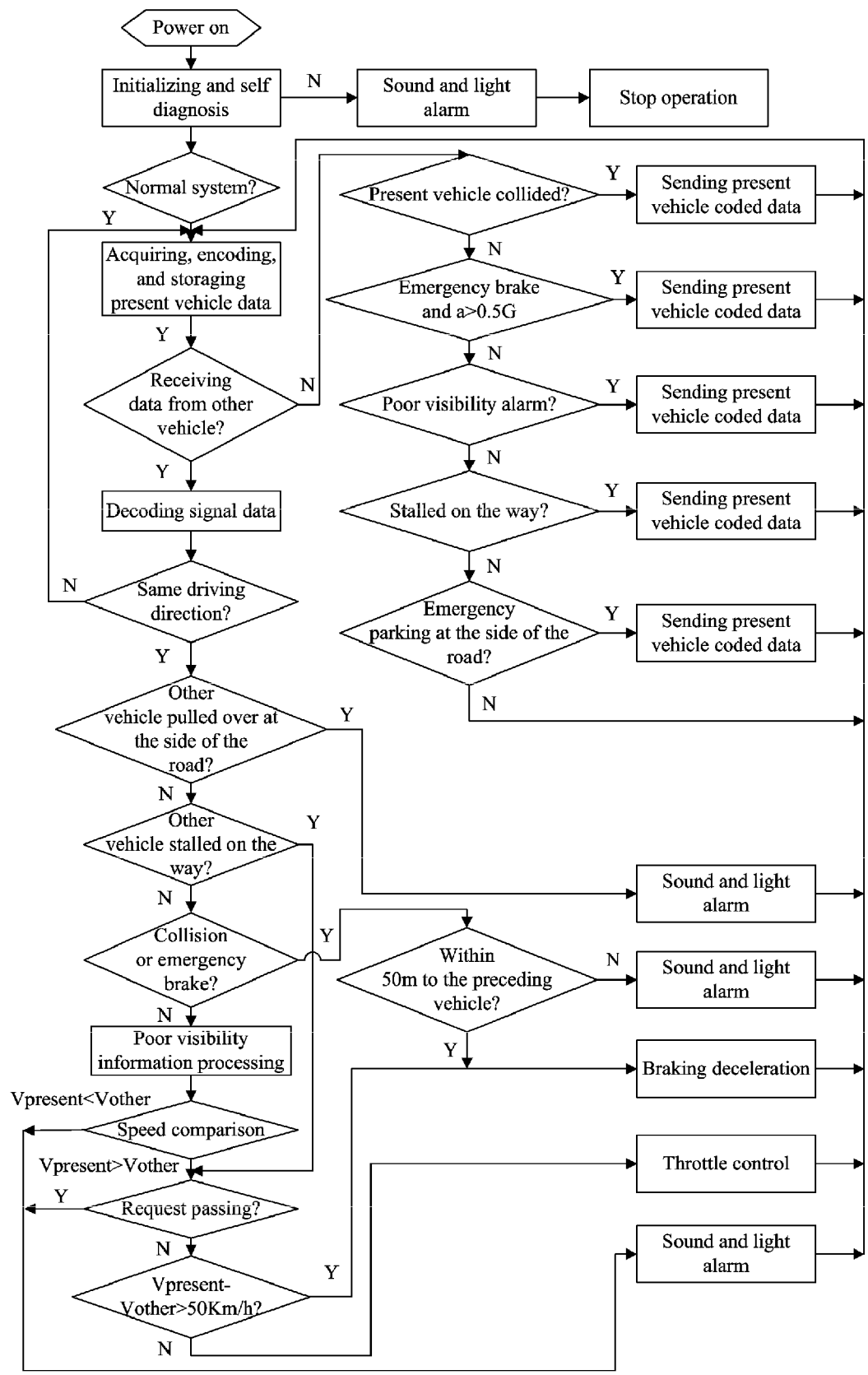
FIG. 2 is a process control flow diagram in accordance with one embodiment the invention.

FIG. 2 is a program controlled process flow of the invention; the operation of the invention is then described below with specificity according to this process flow.

When the driver turns on the power switch, the system is powered on to initialize and self diagnose to detect system status. If the system is in trouble, a sound and light alarm will be sent out, and simultaneously, the operation of the system will be stopped.

If the system is diagnosed as normal, then the program flows to the traveling data monitoring and sampling process for present vehicle to code the command and store data, and to determine whether the system is in a status of receiving signal. According to the status of the system, the program flows to the judgment process for collision prevention information and the judgment process for collision prevention information transmitting condition of present vehicle, respectively.

When the system is in the status of receiving signal, the program will decode the collision prevention information firstly, and then determine the traveling direction. If the traveling direction is different, the program will stop and return to a next cycle; if the traveling direction is same, the program will continues to determine whether the collision prevention information contains the information of "other vehicle pulled off to the road side?", if yes, the system will transmit a sound and light alarm out; if not, the program will continue to determine whether the collision prevention information contains the information of "other vehicle stalled on the way?", if yes, the program continues to determine whether the present vehicle is requesting passing. When the present vehicle is in the status of passing, indicating that the driver has noted the preceding conditions, the system will transmit a sound and light alarm out only to help the driver to finish the passing process.

If the present vehicle is not in a status of passing, the program then follows the process to determine the speed difference between the present vehicle and the other vehicle in front of the present vehicle. If the traveling speed of the present vehicle is higher than that of the other vehicle, and the difference is larger than 50 km/h, the system will brake the vehicle immediately, but if difference is less than or equal to 50 km/h, the system will drive the throttle apparatus to reduce the throttle opening so as to control the traveling speed of the present vehicle, and thereby, to pass the preceding vehicle.

If the received collision prevention information does not contain the information of "other vehicle stalled on the way", the program continues to determine whether it contains the information of "other vehicle collided or emergently braked", if yes, the program will calculate the distance between the two vehicles, and if the distance is larger than 50 m, the system will only transmit a sound and light alarm, but if the distance is less than or equal to 50 m, the system will conduct brake operation.

If the received collision prevention information does not contain the information of "other vehicle collided or emergently braked", the program will go on to the information processing of "poor visibility", and compare the speed of the two vehicles. If the speed of the present vehicle is lower than or equal to that of the other vehicle, the system will transmit out a sound and light alarm only; if the speed of the present vehicle is higher than that of the other vehicle, the program will determine whether the present vehicle is in a status of requesting passing, if yes, the system will transmit out a sound and light alarm; if not, the program will continue to compare the speed further. When the speed of the present vehicle is higher than that of the other vehicle and the speed difference is greater than 50 km/h, the system will conduct brake operation; if the speed difference is less than or equal to 50 km/h, the system will drive the throttle to reduce the throttle opening so as to decrease the traveling speed.

If the system did not receive the collision prevention information, the program will go on to the judgment process of command generation for the traveling data of present vehicle so as to analyze and process the traveling data sampled in real time by the sensor of present vehicle, to determine orderly whether it contains the sampled data of "the present vehicle collided", "the present vehicle emergently braked and the brake deceleration is more than 0.5 g", "whether the present vehicle is traveling in a poor visible environment", "whether the present vehicle is stalled on the way", and "whether the present vehicle is pulled emergently off to the road side". If it contains the relevant sampled data and the magnitude is reached the predetermined value, the system will encode the data into corresponding collision prevention information, and transmit the information out to warn other vehicles traveling in the effective coverage range of the radio signal to avoid collision. If it does not contain the relevant sampled data, the program will stop and return to the next cycle.

The present vehicle traveling data monitoring unit comprises a manual warning data and a sensor sampled data, wherein the manual warning data includes the data of present vehicle pulled emergently off to the road side, the present vehicle stalled on the way, and the present vehicle traveling in a poor visible environment; the sensor sampled data includes brake acceleration, speed, traveling direction, brake pressure, and so on, which are real time sampled by the sensor.

When the vehicle is pulled off to the road side for maintenance or driver rest, the driver can turn on the switch of "emergently pulled off to the road side" to generate collision prevention information immediately for radio transmission, so that the vehicles traveling in the effective coverage range of the radio signal can receive the collision prevention warning signal, and a voice of "a vehicle is parked at the road side, be care of collision!" will be generated by the speech circuit, the corresponding alarm indicator will light up automatically.

When the vehicle is stalled on the way due to some emergency such as punctured tire or broken axle, the driver can turn on the switch of "stalled on the way" to generate corresponding collision prevention information so as to warn the vehicles travelling into the hazard range. A voice signal of "a vehicle is stalled on the way, hazard!" will be generated by the speech circuit, the corresponding alarm indicator will light up, and the opening of the throttle will be reduced. If the traveling speed of the present vehicle is higher than 50 km/h, the system will apply brakes.

If the driver requests to pass other vehicles when the safety is ensured, the passing signal indicator can be turned on, the joint control deceleration function of the present vehicle will be suppressed; a traveling speed higher than 50 km/h can be kept for passing.

When the vehicle is traveling in a poor visibility environment, due to rain, fog, or snow, the driver can turn on the switch of "poor visibility" to generate collision prevention information, so that the vehicles traveled into the effective coverage range of signal can be warned by receiving the collision prevention signal; a voice of "poor visibility, please travel at a low speed, avoid rear end collision!" will be generated by the speech circuit, the alarm indicator will light up simultaneously. The ECU circuit will compare the received collision prevention speed data with the speed of the present vehicle so as to output control command to the throttle or braking mechanism. If the traveling speed of the present vehicle is higher than that of the preceding vehicle, the throttle opening will be reduced to slow down the vehicle; if the traveling speed of the present vehicle is much higher than that of the preceding vehicle, for example, Vpresent−Vpreceding>50 km/h, the ECU will apply brakes to decelerate the present vehicle to keep a safety traveling distance between two or more vehicles traveling in a poor visible environment to avoid rear end collision.

When the preceding vehicle turns on the warning switch of "poor visibility", if the vehicle traveling behind requests a passing, the driver can turn on the passing indicator, the ECU will suppress the speed control function of the throttle or braking mechanism to facilitate the passing of the vehicle behind.

The sensor real time monitoring circuit in the traveling data monitoring unit of present vehicle comprises an orientation sensor, a braking force sensor, an acceleration sensor, and a speed sensor. The acceleration sensor serves to monitor the collision or emergent brake of present vehicle. When a collision is occurred, the deceleration increases sharply (-a>g, where g is gravity acceleration); when the driver brakes emergently, the braking deceleration can reach above 0.5 g. Therefore, when the acceleration sensor monitored that the braking deceleration is larger than 0.5 g, collision prevention information will be generated automatically so as to jointly control the throttle and/or the braking mechanism to decelerate the following vehicle.

The braking force sensor serves to monitor the service braking of vehicle. When the service braking results in a pressure inside of the braking line raised to the predetermined value, collision prevention information will be generated automatically so as to jointly control the throttle and/or braking mechanism to decelerate the following vehicle.

The speed sensor adopts a vehicle speed sensor, such as Hall speed sensor, and an electromagnetic speed sensor. The sampled data will be transmitted along with the collision prevention information of the present vehicle, and acts as comparison signal at the same time transmitted to the ECU circuit for comparison with the speed information in the collision prevention information transmitted from the other vehicle.

Figure 3:
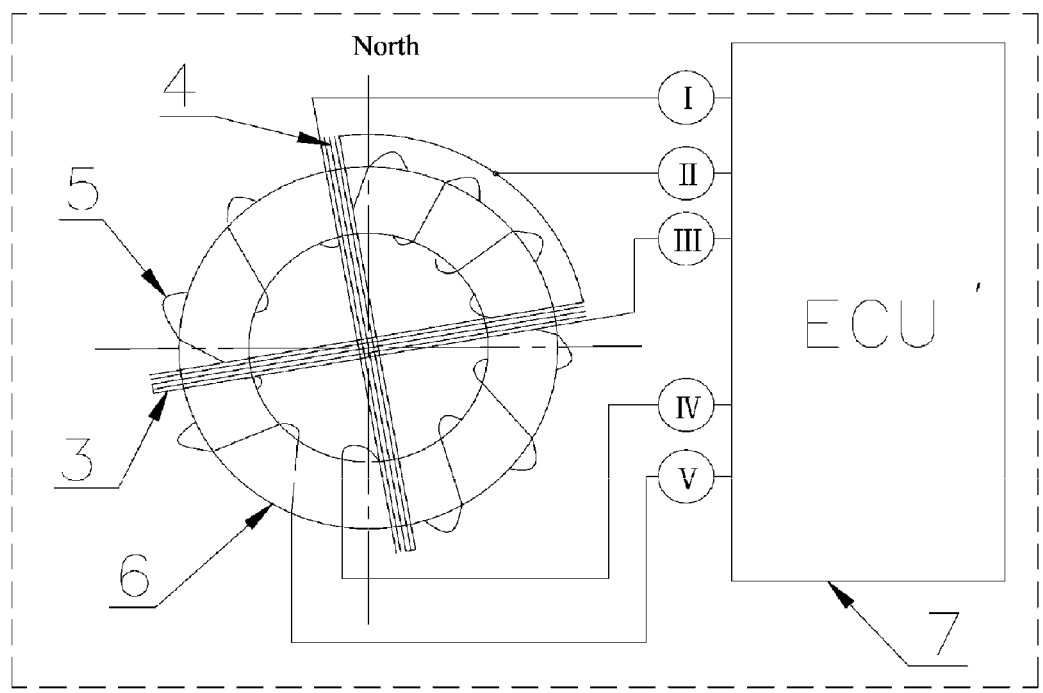
FIG. 3 is a principle diagram of a geomagnetic orientation sensor in accordance with one embodiment of the invention.
Figure 4:
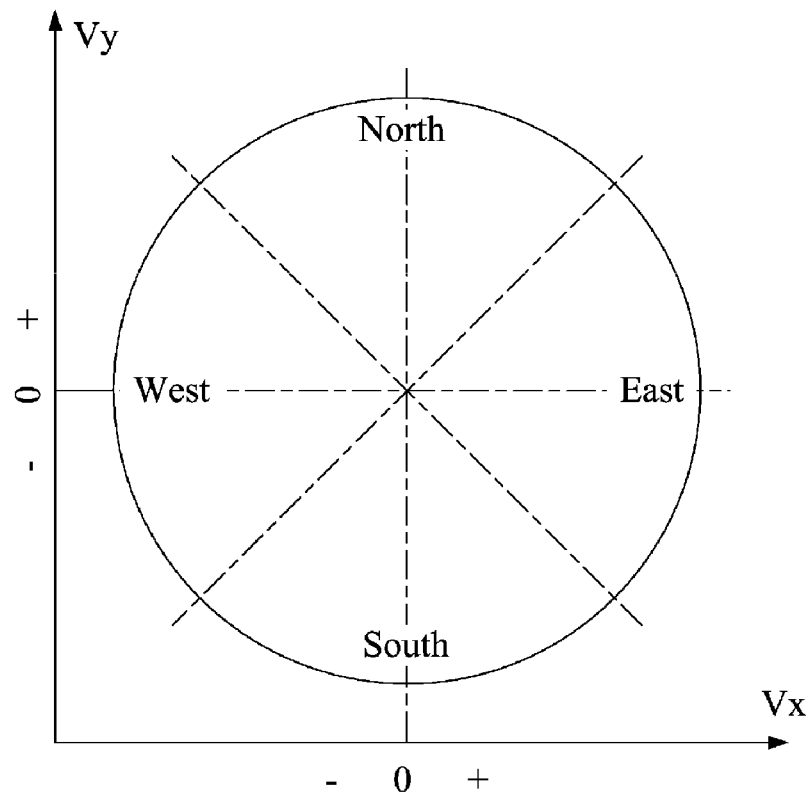
FIG. 4 is an orientation interpretation diagram of a geomagnetic orientation sensor.

The orientation sensor adopts geomagnetic orientation sensor or a digital compass integrated circuit. FIG. 3 illustrates a geomagnetic orientation sensor, comprising a test coil X 3, a test coil Y 4, a drive coil 5, a circular iron core 6, and an orientation data processing circuit (ECU') 7. The drive coil 5 generates alternating magnetic field whose direction and strength vary periodically on the circular iron core, a corresponding voltage change is generated on the test coils X and Y, respectively. After processed and calculated by the special orientation test electronic circuit (ECU'), the real time orientation signal of the vehicle can be detected. FIG. 4 illustrates the orientation determination diagram of the geomagnetic orientation sensor. The orientation radio signal will be transmitted along with the collision prevention information of present vehicle, and at the same time, is transmitted to the system ECU circuit to determine the traveling directions of two or more vehicles; the collision prevention information transmitted from the vehicles traveling in an opposite direction will be suppressed.

Since a vehicle is a kind of movable transportation means, in order to realize the invention, all the vehicle transceivers for the rear end warning and collision prevention system must share the same radio frequency and use open transmitting and receiving without code identification, having the characteristics of self-organized network. Based on this, the invention adopts the work mode of same frequency time sharing transmitting and receiving wherein the receiving is realized prior to transmitting. When the present vehicle needs to transmit and receive signal alternately, the work mode of time sharing transmitting and receiving is adopted wherein each signal transmitting duration is set as a time to transmit three effective command strings, while the signal receiving duration is set as a multiple of the signal transmitting duration (e.g., the transmitting and receiving duration ratio of the present embodiment is 5:1), and thus the transmission and receiving can be conducted alternately, so that the intervening problem of transmitting and receiving of the present vehicle is solved, and the reliability of the signal transmission of the present vehicle is ensured.

The work mode of receiving occurring prior to transmitting can also be explained as competition for transmitting first, namely, in the effective coverage range of the signal, as long as one transmitter requests for transmitting signal data, other receivers will be in the status of receiving data automatically. Once the data is received completely, the transmitters having data transmitting request can transmit the data. If there is more than one transmitter, the transmitters will compete for the priority of data transmission. In order to avoid the conflict caused by the competition for data transmission under the self-organized network, namely, the system is halted due to the competition of more than one transmitter simultaneously; the invention adopts the work mode of random selection within a certain range for the transmission duration. For example, the time interval for transferring the receiving status to the transmitting status can be selected randomly from 1 ms to 10 ms, then the time interval for different transmitters in the same self organized network is different, or having a low probability of being the same, so that the transmission conflict or a signal halt can be avoided, and only one transmitter transmitting signal at any time can be ensured. Thus, the intervening problems of same frequency transmission and of unordered transmitting and receiving in the same frequency region can be avoided.

The work mode of same frequency time-shared transmitting and receiving with prior receiving can ensure safe traveling under poor visibility conditions. When the present vehicle requests to transmit collision prevention information and to receive the collision prevention information from other vehicles simultaneously, this work mode can satisfy the above requirement to realize safe traveling under poor visibility.

The work mode of radio signal all directional transmission and fixed directional receiving can ensure that the collision prevention information of the present vehicle can only warn and joint control the vehicles behind traveling in the same direction. The transmitter of the present vehicle adopts fixed directional antenna (such as yagi or slit antenna, or a plate antenna) pointing in the traveling direction. The fixed directional antenna can suppress the signal from the sides or from behind of the present vehicle, and receive only the signal from a certain range in front of the present vehicle. By utilizing all directional transmitting antenna, the blind area and dead corner of radio fixed directional transmission can be eliminated, and the trace precision requirement of transceiver to the signal source is reduced.

The radio transmitting and receiving circuit of the invention selects the frequency above 300 MHz in the microwave band region as the permitted useful frequency. The signal power of collision warning information is controlled to cover an effective coverage radius of 200 m. The function of fixed receiving is realized through the fixed directional antenna. Taking into consideration the installation position and aesthetics of vehicle, preferably the yagi antenna and slit antenna are used.

The technology of radio transmission and receiving and of the same frequency time sharing transmission and receiving in the microwave band region are mature technologies in the fields of existing communication technology, especially with the mature application of embedded radio on-chip system, the above functions can be realized precisely and reliably. The details of this technology will not be elaborated here.

Figure 5:
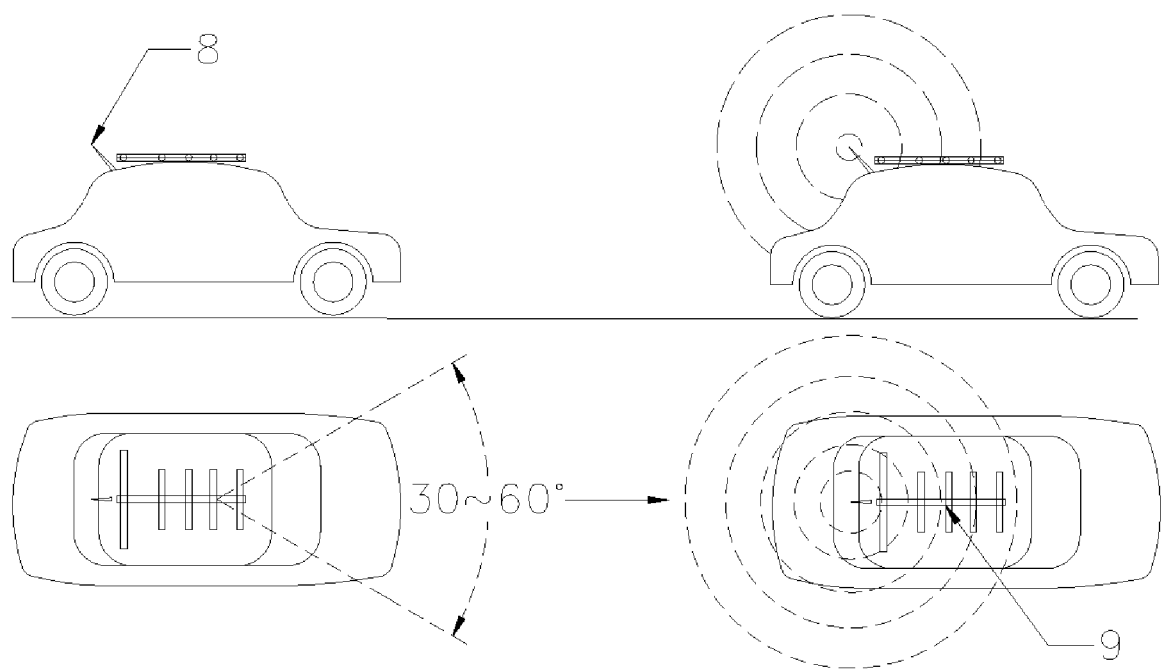
FIG. 5 is an installation diagram of a transmitting and receiving antenna on a compact car.

FIG. 5 shows the structure of a radio all-directional transmission and fixed directional receiving and its installation diagram. The all directional transmitting antenna 8 is installed on the top of or at the rear portion of the vehicle; the beam angle of the fixed directional receiving antenna in the horizontal plane is in the range of 300-600; the front and behind gain ratio of the fixed directional antenna is larger than 3.

The fixed directional receiving antenna is installed on the top of the vehicle; the installation and fix method can refer to the installation of a top warning light, a marker light, or a multifunctional vehicle top luggage rack.

The electronic control unit (ECU) comprises a CPU, an RF transceiver module, and an auxiliary circuit, and serves to complete the below-described logical calculation and program control functions: 1) to perform countering calculation, A/D transformation, and encoding of the sensor signal so as to generate collision prevention information for transmitting to the modulated transmitting unit; 2) to form time sharing transmitting and receiving control command and prior receiving control command; 3) to decode the received collision prevention information, the decoded data is sent to the comparison, calculation, and logical control circuit for processing; 4) to analyze and process the field strength power level of received collision prevention signal to determine the distance range; 5) to compare the speed and orientation signal data of the received collision prevention information with that of the present vehicle; and 6) to process the request of the driver for passing.

The invention adopts the power level of radio signal field strength to express the distance range between the present vehicle and the signal source in front of the present vehicle, so as to classify the signal coverage region into a warning region and a joint control region, realized in the following way: setting the effective coverage radius of the transmitter power to 200 m, and the work radius of joint control deceleration to 50 m; calculating and actually measuring the signal field strength gradient to determine the signal power level value corresponding to the distance range and stored in the system as the predetermined data; comparing the predetermined data with the received signal power level value to determine the distance range.

The execution and drive unit of the invention is an existing mature technology. The sound and light circuit comprises a voice circuit and a LED or LCD, the function of the throttle control is to reduce the opening of the throttle to decrease the motor power and rotation speed so as to decelerate the vehicle according to the program controlled command.

The specific operation types of the braking mechanism and throttle control mechanism of the existing technology are matchable with the invention and thus can be used in the invention to control the traveling speed driven by the automatic control system. The details of this technology will not be elaborated here.

What is claimed is:

1. A method for passive vehicle rear end warning and collision prevention comprising:
monitoring and sampling of traveling data of a present vehicle, and generating collision prevention information according to the monitored and sampled traveling data, and then radio transmitting said collision prevention information according to a predetermined program so as to prevent rear end collision by other vehicle; and
receiving the collision prevention information transmitted from other vehicle, and comparing the received collision prevention information with relevant traveling data of the present vehicle so as to adjust and control traveling status of the present vehicle to avoid rear end collision with other vehicle from which said collision prevention information is transmitted.

2. The method of claim 1, wherein said traveling data comprises speed data of the present vehicle, traveling direction data, collision or braking deceleration data, braking pressure data, data of present vehicle emergently pulled off to the road side, information about whether present vehicle is stalled on the way, data of present vehicle traveling in a poor visibility environment, or data of present vehicle requesting passing.

3. The method of claim 1, wherein said radio transmitting and receiving of information follows a predetermined program of same frequency time sharing transmitting and receiving, wherein the receiving is prior to the transmitting in the microwave frequency range of above 300 MHz, and an all direction transmitting antenna and a fixed direction receiving antenna are utilized so as to ensure to only receipt of the radio signal from a preceding vehicle only.

4. The method of claim 1, wherein processing of said received collision prevention information, comparison of the collision prevention information with the relevant traveling data of present vehicle, and the adjustment and control of traveling status of present vehicle are realized in said electronic control unit (ECU); and the comparison with the relevant traveling data of present vehicle comprises the steps of: processing and analyzing the sampled data, sensor sampled data and manual set data, of present vehicle to generate collision prevention information for sending to radio transmitting circuit, and controlling the radio transmitting circuit to transmit the collision prevention information according to a predetermined program of same frequency time sharing transmitting and receiving with the receiving being prior; comparing the receiving collision prevention information with the relevant traveling data of present vehicle so as to perform the actions of determining the traveling direction, determining distance range based on joint control of signal field intensity of collision prevention information, and comparing the speed data of collision prevention information with real time speed of present vehicle, whether requesting passing or not; and outputting the traveling status control command or
drive power according to the predetermined program so as to adjust and control the traveling status of present vehicle.

5. A passive vehicle rear end warning and collision prevention apparatus, comprising: a traveling data monitoring and sampling unit, a microwave radio transmitting and receiving unit, and an electronic control unit, wherein the traveling data monitoring and sampling unit serves to monitor and sample the traveling data of present vehicle; the sampled data is transmitted to the electronic control unit; the microwave radio transmitting and receiving unit serves to transmit the collision prevention information of present vehicle, and to receive the collision prevention information transmitted from other vehicle; and the electronic control unit serves to analyze and process the traveling data of present vehicle, to generate collision prevention information according to the predetermined program or to compare the received collision prevention information with the traveling data of present vehicle, and to output traveling control command to adjust and control the traveling status of present vehicle so as to realize rear end warning or collision prevention.

6. The apparatus of claim 5, wherein said traveling data monitoring unit comprises a sensor monitoring and sampling part for obtaining sensor sampled data, and a manual set sampling part; the sensor sampled data includes speed, brake or collision deceleration, braking pressure, traveling direction; and the manual set sampled data includes preset data selected from poor visibility, pulled off to the road side, and stalled on the way.

7. The apparatus of claim 5, wherein said collision prevention information comprises a rear end warning signal, a collision prevention joint control signal, and a real time speed and traveling direction signal.

8. The apparatus of claim 5, wherein said microwave radio transmitting and receiving unit adopts an all direction antenna for transmitting and a fixed direction antenna for receiving.

9. The apparatus of claim 5, wherein said electronic control unit adopts CPU as its core component to realize: processing and analyzing the sampled data, sensor sampled data and manual set data, of present vehicle to generate collision prevention information for sending to radio transmitting circuit, and controlling the radio transmitting circuit to transmit the collision prevention information according to the predetermined program of same frequency time sharing transmitting and receiving with the receiving being prior; comparing the receiving collision prevention information with the relevant traveling data of present vehicle so as to perform the actions of determining the traveling direction, determining the distance range based on the joint control signal field intensity of collision prevention information, comparing the speed data of collision prevention information with the real time speed of present vehicle, whether requesting passing or not; and outputting the traveling status control command or drive power according to the predetermined program so as to adjust and control the traveling status of present vehicle.

\* \* \* \* \*